US010207443B2

(12) United States Patent
Krohmer et al.

(10) Patent No.: US 10,207,443 B2
(45) Date of Patent: *Feb. 19, 2019

(54) METHOD FOR MANUFACTURING AN INSULATING BAR

(71) Applicant: Ensinger GmbH, Nufringen (DE)

(72) Inventors: Christoph Krohmer, Mötzingen (DE); Lena Stiehl, Stuttgart (DE)

(73) Assignee: ENSINGER GMBH, Nufringen (DE)

( * ) Notice: Subject to any disclaimer, the term of this patent is extended or adjusted under 35 U.S.C. 154(b) by 293 days.

This patent is subject to a terminal disclaimer.

(21) Appl. No.: 15/267,184

(22) Filed: Sep. 16, 2016

(65) Prior Publication Data

US 2017/0001358 A1     Jan. 5, 2017

Related U.S. Application Data

(63) Continuation of application No. PCT/EP2015/055698, filed on Mar. 18, 2015.

(30) Foreign Application Priority Data

Mar. 19, 2014    (DE) .................. 10 2014 103 729

(51) Int. Cl.
*B29L 9/00*   (2006.01)
*B29C 43/06*  (2006.01)
(Continued)

(52) U.S. Cl.
CPC .......... *B29C 47/0061* (2013.01); *B29C 43/06* (2013.01); *B29C 43/222* (2013.01);
(Continued)

(58) Field of Classification Search
CPC ........... B29C 47/0019; B29C 47/0021; B29C 47/004; B29C 47/0061; B29C 47/0066;
(Continued)

(56) References Cited

U.S. PATENT DOCUMENTS 2,896,692 A    7/1959  Villoresi
4,079,114 A *  3/1978  Bonner ................. B29C 59/007
                                                    264/147
(Continued)

FOREIGN PATENT DOCUMENTS

CH          449 247        12/1967
CN     103442880 A  *  12/2013  ............. B29C 59/04
(Continued)

OTHER PUBLICATIONS

International Bureau, International Search Report in International Patent Application No. PCT/EP2015/055698, dated Jul. 17, 2015.
(Continued)

*Primary Examiner* — William P Fletcher, III
(74) *Attorney, Agent, or Firm* — Leydig Voit & Mayer

(57) ABSTRACT

A method for manufacturing insulating bars made from a thermoplastic material, comprising: producing a band-shaped extrudate having a substantially rectangular cross-section from the thermoplastic material; producing an individual insulating bar or a plurality of insulating bars from the band-shaped extrudate in the longitudinal direction thereof; and severing the insulating bar or bars arrangement in the longitudinal direction thereof to provide separated insulating bars.

31 Claims, 14 Drawing Sheets

(51) Int. Cl.

| | |
|---|---|
| *B29C 43/22* | (2006.01) |
| *B29C 43/46* | (2006.01) |
| *B29C 47/00* | (2006.01) |
| *B29C 47/06* | (2006.01) |
| *B29L 31/00* | (2006.01) |
| *E06B 3/263* | (2006.01) |
| *B29K 101/12* | (2006.01) |

(52) U.S. Cl.
CPC .......... *B29C 47/0019* (2013.01); *B29C 47/06* (2013.01); *B29C 47/0066* (2013.01); *B29C 2043/463* (2013.01); *B29C 2793/009* (2013.01); *B29K 2101/12* (2013.01); *B29L 2009/00* (2013.01); *B29L 2031/003* (2013.01); *E06B 2003/26358* (2013.01)

(58) Field of Classification Search
CPC ....... B29C 43/06; B29C 43/22; B29C 43/222; B29C 43/24; B29C 43/34; B29C 59/00; B29C 59/007; B29C 59/02; B29C 69/00; B29C 69/001; B29C 2791/003; B29L 2031/003; B29K 2101/12
USPC ..................... 264/151, 175, 176.1, 211.12
See application file for complete search history.

(56) References Cited

U.S. PATENT DOCUMENTS

| | | | |
|---|---|---|---|
| 4,128,369 A | 12/1978 | Kemerer et al. | |
| 4,395,862 A | 8/1983 | Jäger et al. | |
| 4,674,972 A | 6/1987 | Wagner | |
| 5,727,356 A * | 3/1998 | Ensinger | E06B 3/26303 49/DIG. 1 |
| 7,871,261 B2 | 1/2011 | Steiner et al. | |
| 2005/0008825 A1 | 1/2005 | Casey et al. | |

FOREIGN PATENT DOCUMENTS

| | | | | |
|---|---|---|---|---|
| DE | 1 604 699 | | 3/1971 | |
| DE | 28 50 428 | | 5/1980 | |
| DE | 29 37 454 A1 | | 4/1981 | |
| DE | 32 36 357 A1 | | 4/1984 | |
| DE | 198 04 222 C2 | | 4/2003 | |
| DE | 20 2008 012 945 U1 | | 12/2008 | |
| DE | 10 2007 050523 A1 | | 4/2009 | |
| DE | 10 2011 113 456 A1 | | 9/2012 | |
| EP | 2 497 888 A2 | | 9/2012 | |
| EP | 2497888 A2 * | | 9/2012 | ........... E06B 3/2675 |
| EP | 2 559 838 A2 | | 2/2013 | |
| GB | 1132969 | | 11/1968 | |
| WO | WO 2007/128787 A1 | | 11/2007 | |

OTHER PUBLICATIONS

International Bureau, Written Opinion in International Patent Application No. PCT/EP2015/055698, dated Jul. 17, 2015.
German Patent Office, Search Report in German Patent Application No. 10 2014 103 729.4, dated Jan. 12, 2015.
International Preliminary Report on Patentability in International Application No. PCT/EP2015/055698, dated Sep. 20, 2016.

* cited by examiner

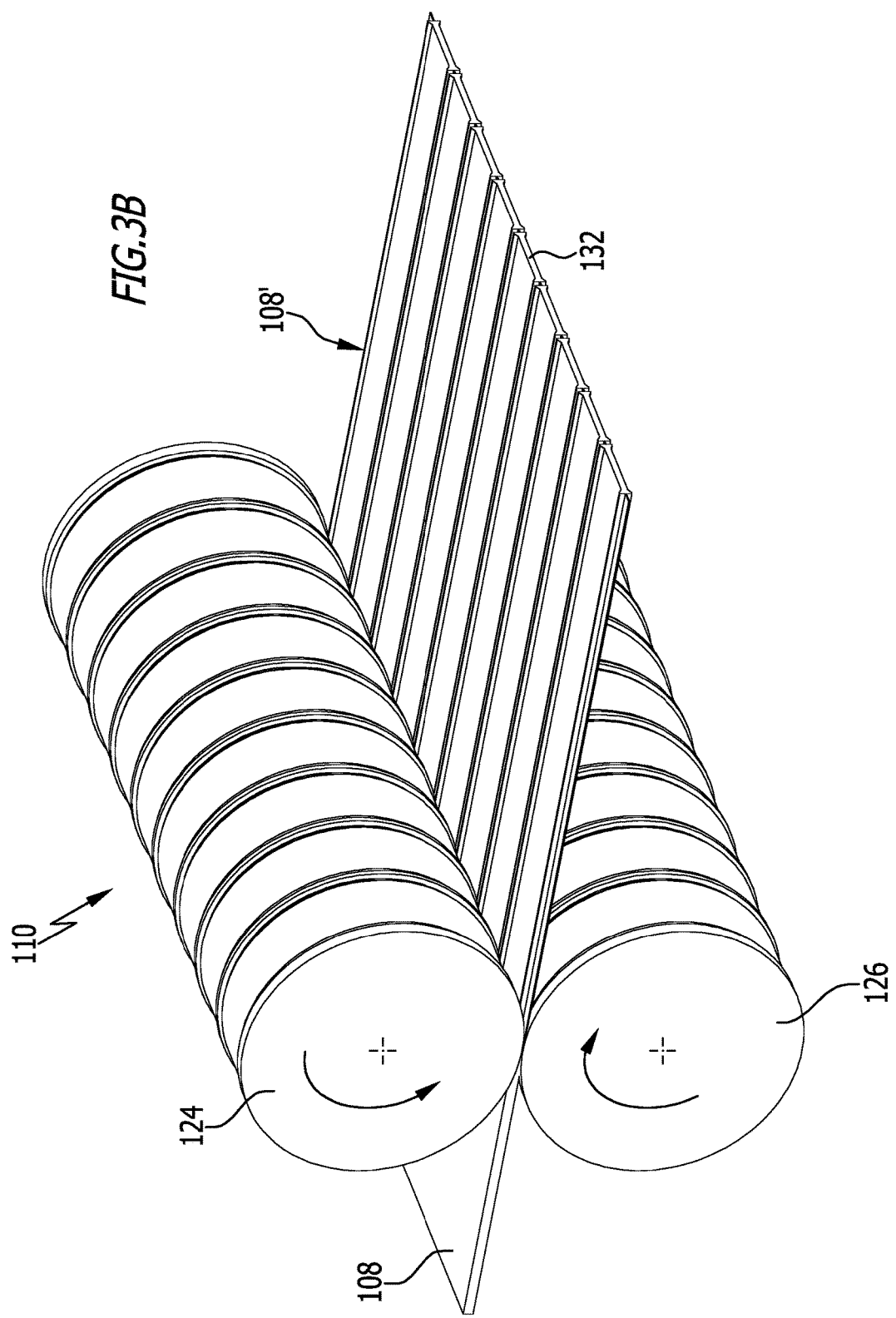

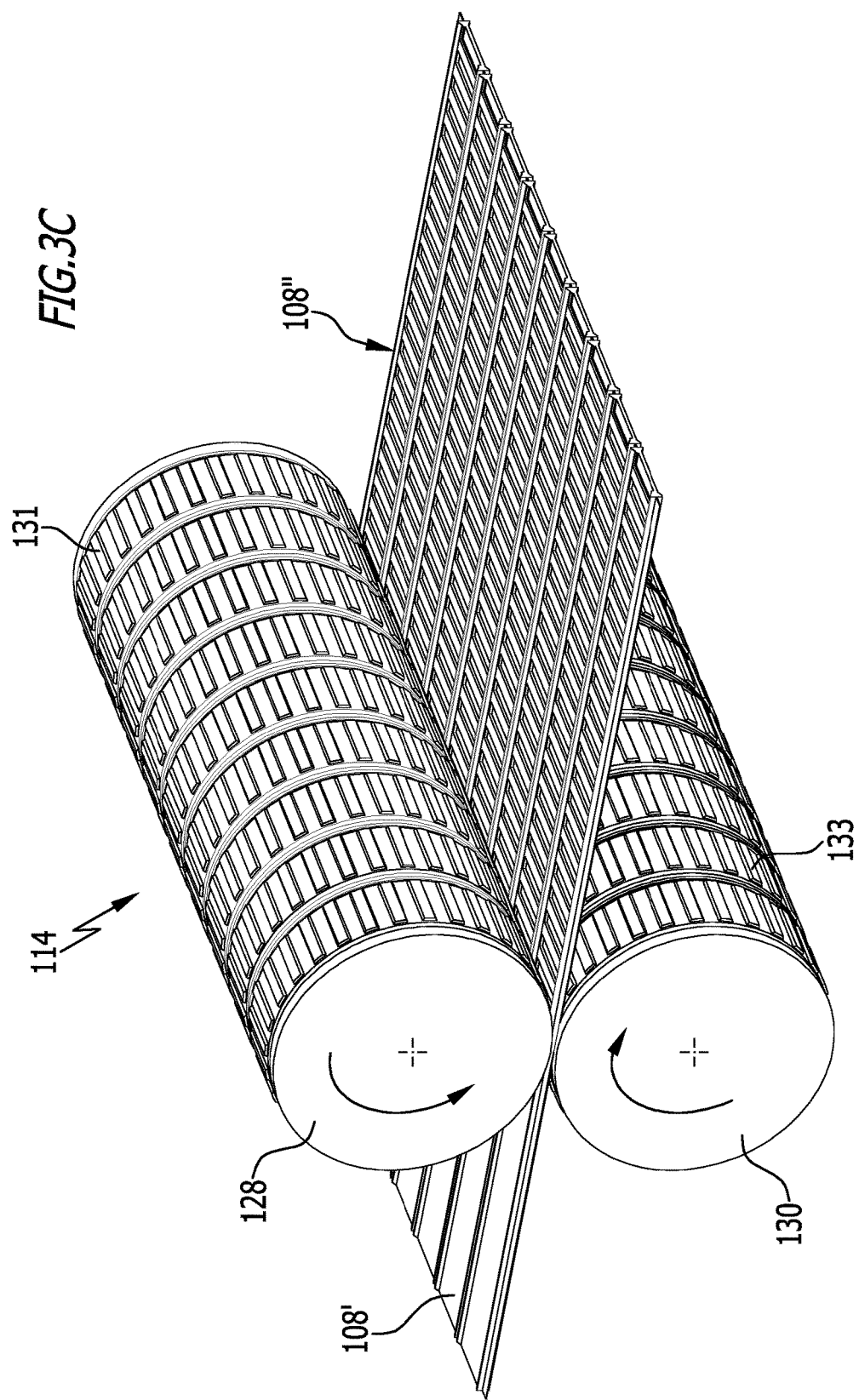

METHOD FOR MANUFACTURING AN INSULATING BAR

CROSS REFERENCE TO RELATED APPLICATIONS

This patent application is a Continuation of International Patent Application No. PCT/EP2015/055698, filed Mar. 18, 2015, which claims the benefit of German Patent Application No. 10 2014 103 729.4, filed Mar. 19, 2014, which are each incorporated by reference.

BACKGROUND OF THE INVENTION

The invention relates to a method for manufacturing an insulating bar for composite profiles, wherein the insulating bar is made from a thermoplastic plastics material and has a strip-like base body and, integrally formed on the opposite longitudinal edges thereof, connection strips.

Insulating bars of this kind are used during the manufacture of composite profiles for a shear-resistant mechanical connection and thermal insulation of metal profiles that are to be arranged on the outside and the inside, as are used in particular for manufacturing window frames, doorframes, façade elements and similar.

Insulating bars of this kind are known in many forms, for example among others from DE 32 36 357 A1, and depending on the spacing required between the metal profiles of the composite profile are made to appropriate widths.

Conventionally, the insulating bars have a substantially planar base body and are manufactured together with the connection strips in the course of extrusion, by means of a tool that is adapted to the cross sectional geometry.

More recently, it has been proposed to use insulating bars having a structured base body in order to improve the heat insulation without reducing the static strength of the composite profile (cf. for example EP 2 497 888 A2).

For improving the heat insulating properties of the composite profiles that are formed in this way, it has been proposed, among others in EP 2 497 888 A2, that the base body should be provided with a corrugated structure extending transversely as seen in the longitudinal direction of the insulating bar. The improvement in heat insulation that is achievable thereby results on the one hand from the fact that the corrugated structure increases the length of the path that the insulating bar provides for heat conduction from one metal profile to the other. On the other hand, the corrugated structure improves the rigidity of the insulating bar such that, with the same mechanical properties, smaller wall thicknesses are possible in the base body of the insulating bar, such that the cross section available in the insulating bar for heat conduction can additionally be reduced.

Moreover, losses due to both heat radiation and heat convection are expected to be lower as a result of using insulating bars of this kind.

In principle, this kind of insulating bar can be formed by machining out of an insulating bar that is manufactured with a substantially planar base body, or indeed can in principle be manufactured with the final structure by the method of injection moulding.

However, machining is not only time-consuming but also demands a high consumption of materials. The method of injection moulding, on the other hand, finds its limits very quickly, since the insulating bars are conventionally manufactured by the meter, for example to a length of 6 m. The injection moulds needed for this are not only extremely expensive but are also problematic, at the required insulating bar lengths, as regards sufficiently uniform filling of the moulds.

Further, a combined method based on injection moulding and extrusion is known (WO 2007/128787 A1) by means of which profiled elongate component parts can be made. With the method described there, it proves disadvantageous that the moulds that are needed for application to products described in this application require a very great longitudinal extent and are thus complex and disproportionately expensive. Admittedly, the structures described could be produced by this method in theory, but only with additional work steps that demand forming subsequent to the procedure of filling the mould during cooling of the product, or machining.

BRIEF SUMMARY OF THE INVENTION

In insulating bars, it is important to keep within a small tolerance in the dimensions of the connection strips, since during processing to give composite profiles the connection strips have to be pushed into receptacles of complementary shape in the metal profiles. In order to ensure that the insulating bars are connected to the metal profiles as well as possible and in particular in shear-resistant manner, the dimensions of the cross section of the receptacles preferably differ only slightly from those of the connection strips. For this reason, a manufacturing method for the structured insulating bars must in particular also provide the assurance that it is possible to keep within the tolerance stipulations for the connection strips.

In order to take account of the different widths of the insulating bars, conventionally separate extrusion tools having extrusion nozzles of a specific construction are required, for each width and furthermore for each required alignment of the connection strips in relation to the base body, and for this reason a corresponding tool has first to be provided when there is a switch-over in production. This is not only associated with costs but also demands corresponding lead times for any required manufacture of the tools.

Frequently, insulating bars having connection strips that are arranged offset to the base body are needed, in particular in order to increase the path for heat conduction while maintaining the same overall size. For these variants too, separate extrusion tools are conventionally required.

It is the object of the invention to propose a method by means of which the known insulating bars may be manufactured economically with the respectively required dimensions and cross sectional shapes, in particular also having a corrugated structure of the base body.

This object is achieved according to the invention by a method as defined in claim 1.

In the first step, the band-like extrudate is continuously produced, by means of extrusion or pultrusion of the plastics material, with a substantially rectangular cross section. Specific contours that are required for the insulating bar to be produced, including the connection strips, are produced in subsequent steps by forming of the band-like extrudate.

By comparison with methods of the prior art, the invention does not follow the route of extrusion or pultrusion using an individual extrusion/pultrusion tool in order to produce an insulating bar in its finished cross sectional geometry, or indeed the even more complex route of the injection moulding method, but produces the required geometry of the cross section of the insulating bar in a step downstream of the extrusion/pultrusion.

In this way, first the not inconsiderable costs of specifically constructed extrusion/pultrusion tools or injection moulding tools are saved, since nozzles of simple shape having a rectangular cross section are sufficient for production of the band-like extrudates. The cross sectional geometry that differs from a rectangular shape and which is required in individual cases is then produced by forming, subsequent to the extrusion/pultrusion procedure.

According to the invention, the insulating bar may be produced from the initially substantially planar band-like extrudate by forming using tools that are not only usable for a single cross section but are suitable for producing various cross sectional geometries.

As it comes out of the nozzle, the plastics material is in the form of a molten extrudate which, on cooling, results in the extrudate that is handlable as a strip.

For the forming, the band-like extrudate is supplied to a forming tool directly or indeed at a predetermined temporal/spatial interval after coming out of the nozzle, wherein the heat content of the extrudate is preferably deliberately utilised.

Preferably, during further processing of the band-like extrudate a kind of calibration of the extrudate in respect of its thickness is first carried out. For this, a so-called calender is particularly suitable.

During calibration of the extrudate, the surfaces of the calibration tool, for example the surfaces of the rolls of the calender, are cooled to remove from the plastics material of the band-like extrudate, in a controlled manner, sufficient heat to simplify handling of the planar sheet element that is then obtained, after it leaves the calibration tool.

For example, the surfaces of the calibration tool may be cooled to approximately 100° C. up to approximately 180° C., preferably approximately 120° C. up to approximately 150° C.

As the cooling agent, water having a temperature of approximately 15° C. may be used.

The band-like extrudate may either pass through the calender in one plane, in which case a calender having two rolls is frequently sufficient for the calibration sought, or as an alternative it may be deflected about an angle, for example 90°, for which calenders having three rolls are preferably used.

After exit from the calender, a dimensionally stable but still plastically deformable planar sheet element is obtained, whereof the temperature is preferably above the heat deflection temperature under load (measured according to DIN EN ISO 75 under a load of 1.8 MPA).

Depending on the throughput rate of the band-like extrudate or the planar sheet element that is produced therefrom and the heat content that is still present on entry into the (first) forming tool, cooling during the forming may also be advisable.

If a plurality of method steps are required for the forming, it may be advantageous to supply energy to bring the temperature of the plastics material back into a range that is preferred for the forming.

Forming downstream of the calender is carried out at a temperature that, in the case of (partially) crystalline plastics materials, is geared to the crystallite melting point. The term "crystallite melting point" is understood, in the context of the present invention, to mean the temperature at which the curve in a DSC measurement according to DIN EN ISO 11357-3 reaches the (first) endothermic peak.

During forming, the plastics material is preferably at a temperature in the region of approximately 30° C. below the crystallite melting point or a higher temperature.

Preferably, during forming the temperature is limited to a value of up to approximately 30° C. above the crystallite melting point.

Further preferably, during forming the plastics material is at a temperature in the range approximately ±25° C. either side of the crystallite melting point.

When amorphous plastics materials are used, a preferred temperature during forming is approximately 30° C. above the softening point (DIN EN ISO 306 VST A120) or higher.

Preferably, in this case the temperature during forming is limited to a value of up to approximately 60° C. above the softening point.

If the temperature of the plastics material before a forming step is more than approximately 30° C. above the crystallite melting point or higher than 60° C. above the softening point in the case of amorphous plastics materials, the forming tools are preferably cooled as described above.

If the temperature of the plastics material is in the preferred range of approximately 30° C. below to approximately 30° C. above the crystallite melting point or approximately 30° C. to approximately 60° C. above the softening point, the forming tool is preferably heated to a temperature of approximately 50° C. to approximately 80° C.

According to the invention, it is also possible for two or more insulating bars to be produced at the same time in a parallel arrangement, wherein the insulating bars are first still connected to one another by way of plastics material. Separation of the at first still joined insulating bars is performed in a subsequent step. Separation of the insulating bars may also in particular be performed after complete forming and stamping of all the features, including the corrugated structure.

Severing of the insulating bar arrangement into individual insulating bars, which may be required, is preferably performed at a temperature of the plastics material below the heat deflection temperature under load and further preferably below the maximum long-term service temperature of the plastics material or lower. The maximum long-term service temperature is determined according to DIN 53476.

According to the invention, it is possible to produce insulating bars having different bar geometries in parallel, wherein the different bar geometries may include not only different bar widths and the stamping of different corrugated structures, but also different cross sections of the connection strips.

According to a variant of the method according to the invention, in a first step the base body and the connection strips may be produced from the planar sheet element. Here, the connection strips may be produced in the plane of the base body.

In the event that the connection strips are to be arranged offset to the base body, this geometry may already be obtained during forming of the connection strips or in a subsequent step within the scope of a further forming.

Where appropriate, the calender may also be operated with contoured rolls such that simple cross sectional geometries that differ from a planar shape may already be produced by the calender. For example, in this way, in the simplest case the complete cross sectional geometry of the base body and the connection strips may be achieved. This also applies to insulating bars having connection strips that are arranged offset.

If, in addition to the connection strips, further features of the cross sectional geometry are required, then during forming the base body that is constructed between the connection strips may also be provided with raised portions and recesses such that insulating bars having the corrugated structure described in the introduction are also manufacturable according to the invention.

In that case, if desired, the raised portions and recesses are produced thereafter in a separate forming step. During this separate forming step, the connection strips, which have already been given their finished shape, are preferably protected to prevent their being deformed.

According to a further variant, the planar sheet element may be formed at the same time as the raised portions and recesses and the connection strips are produced. Optionally, if an offset arrangement of the connection strips is required, the connection strips may be given an offset geometry, or the connection strips may be offset in a subsequent forming step.

According to another variant, first the raised portions and recesses of the base body are produced during forming of the planar sheet element, and the connection strips are produced thereafter, in a separate forming step. In this variant too, the connection strips may be produced such that they are offset in one step or the offsetting may be performed in a separate, where appropriate subsequent step.

As already mentioned, the method according to the invention in particular provides the possibility of producing a plurality of insulating bars at the same time. For this purpose, a band-like extrudate that corresponds in its width to a plurality of parallel insulating bar geometries is produced. The plurality of insulating bar geometries are produced at the same time.

In particular, the present invention allows the insulating bar to be manufactured with its base body and the connection strips adjoining the latter having a dimensional accuracy that makes processing of the insulating bars with metal profiles to give a composite profile considerably simpler.

Surprisingly, the method according to the invention succeeds on the one hand in providing a sufficiently pronounced structure in the base body of the insulating bars, in particular also having raised portions and recesses, with a complexity that is economically acceptable, but at the same time in ensuring the dimensional accuracy of the geometry of the connection strips, with the result that processing of the insulating bars to give composite profiles is successful without further measures, in particular also without an after-treatment of the connection strips.

According to the invention, a plurality of insulating bars that are produced in parallel may also be separated from one another in the same step in which the bar geometry is produced. In that case, the forming tool at the same time includes the severing device for separating the individual bars.

Furthermore, insulating bars that have been manufactured according to the invention can be produced with receiving grooves in the connection strips, into which so-called sealing wires made from plastics material may be introduced. By means of these sealing wires, the shear-resistant nature of the finished composite profiles can additionally be ensured.

According to a preferred embodiment of the method according to the invention, during the forming process alternating raised portions and recesses are produced at regular intervals, as seen in the longitudinal direction of the base body.

Further preferably, the raised portions and recesses are produced during the forming process such that they extend substantially over the entire width of the base body. In this way, optimum heat insulation can be achieved using the insulating bars that are manufactured according to the invention.

Further preferably, the raised portions and recesses are oriented substantially perpendicular to the longitudinal direction of the insulating bar, also called the corrugated structure for short. In this way, a maximum effect of stiffening the insulating bars is achieved in relation to forces acting perpendicular to the plane of the base body. Moreover, stabilisation against so-called shunting is achieved, with the result that, if forces of different magnitude act on the two connection strips in the longitudinal direction of the insulating bar, deformation of the insulating bar is countered.

Further preferably, the raised portions and recesses extend at an angle of in particular approximately 30° to approximately 90° in relation to the longitudinal direction of the insulating bar, and stiffen the insulating bars in a manner similar to a framework.

Preferably, production of the raised portions and recesses provides a structure in which surface regions that are attributable to the raised portions and recesses deviate from the centre plane of the base body of the insulating bar by approximately 0.5 times to approximately twice the thickness of the base body. Within these limits, on the one hand a marked effect is achieved as regards the improvement in heat insulation, the improvement in the mechanical strength and hence the possibility of saving on materials, and on the other hand the plastics material is not put under excessive load during the forming process, so the long-term load-bearing capacity of the insulating bars remains ensured. Further preferably, the deviation of the raised portions and recesses from the centre plane is approximately 0.7 times to approximately 1.3 times the thickness of the base body.

As the thermoplastic plastics material for the insulating bars, there is preferably used a material that is selected from polyamides (PA), in particular PA 12 and PA 6,6, polypropylene (PP), acrylonitrile butadiene styrene copolymers (ABS), polyphenylene ether (PPE), syndiotactic polystyrene (sPS), polyvinyl chloride (PVC), polyesters, in particular polyethylene terephthalate (PET) and polybutylene terephthalate (PBT), polyketones, thermoplastic polyurethanes (TPU) and blends of the above-mentioned polymer materials.

For these preferred plastics materials, the crystallite melting points or softening points and the maximum long-term service temperatures are approximately as follows:

| Plastics material | Crystallite melting point [° C.] | Softening point [° C.] | Max. long-term service temperature [° C.] | Heat deflection temperature under load [° C.] |
|---|---|---|---|---|
| Polyamide 6,6 | approx. 250 | — | approx. 100 | approx. 100 |
| Polyamide 6,6 GF 25 | approx. 250 | — | approx. 100 | approx. 230 |
| Polyamide 12 | approx. 180 | — | approx. 100 | approx. 50 |
| Polypropylene | approx. 160 | — | approx. 100 | approx. 100 |
| ABS | — | approx. 100 | approx. 75 | approx. 80 |
| Polyphenylene ether | — | approx. 120 | approx. 85 | approx. 100 |
| Polyester (PET) | approx. 250 | — | approx. 100 | approx. 75 |
| Polyester (PBT) | approx. 220 | — | approx. 100 | approx. 65 |
| Polyketone | approx. 220 | — | approx. 100 | approx. 80 |

The plastics material may be present in the insulating bar as a compact, substantially pore-free material. In this case, the porosity or pore volume is below approximately 3 vol %.

In many cases, it is possible to achieve an improvement in the heat insulation properties of the insulating bars without the mechanical resistance of the insulating bars being insufficient if the plastics material is present as a porous material in at least a partial region of the insulating bar, in particular in the base body. Preferably, in this case the pore volume is approximately 5 to approximately 30 vol %, further preferably approximately 5 to approximately 25 vol %, and most preferably approximately 5 to approximately 20 vol %.

Preferably, the porous plastics material of the insulating bar has an average pore size of approximately 5 μm to approximately 150 μm, further preferably approximately 20 μm to approximately 140 μm.

The porosity of the plastics material of the insulating bar may be achieved by the use of a porous starting material, or indeed be produced only on heating the insulating bar blank to the forming temperature.

Further preferably, the thermoplastic plastics material may contain one or more additives, in particular selected from glass fibres, mineral fibres, plastics fibres, in particular aramid fibres, carbon fibres, hollow glass spheres, and fire retardants, in particular magnesium hydroxide, aluminium hydroxide, melamine derivatives, red phosphorus, inorganic and organic phosphates, and blowing and expansion agents.

Fibrous fillers have a particular significance as additives. These may be embedded in different forms in the plastics materials and the insulating bars that are produced therefrom. Particularly preferred are short, long and continuous fibres, which can be arranged on the one hand in an even distribution in the insulating bars, or at least in the base body, or on the other hand as a two-dimensional flat fibre structure, in particular in the form of felts, fibre mats, nonwovens and woven fabrics. Moreover, the fibrous fillers may also be integrated in the insulating profiles in the form of rovings and fibre strands.

Particularly preferably, the fibrous fillers are embedded in the plastics material with a preferential direction, for example parallel and/or perpendicular to the longitudinal direction of the insulating bar.

Fibrous fillers can be used not only in compact, non-porous plastics materials, but also in the above-described porous materials, in which case relatively large pore volumes can be realised even in the case of insulating bars that are intended to take up relatively high forces.

Further preferably, in the method according to the invention a thermoplastic plastics material that also includes a commercially available so-called impact modifier is used.

Preferably, the tool that is used for forming the base body undergoes a temperature control, wherein the temperature of the tool is in particular kept at a temperature that is approximately 120° C. or less, further preferably approximately 100° C. or less, most preferably approximately 90° C. or less.

Further preferably, the tool is kept constantly at a temperature in the range of approximately 50° C. to approximately 120° C., preferably in the range of approximately 50° C. to 80° C.

For example, when polyamide 6,6 having a glass fibre content of 25 weight % is processed, a tool temperature of approximately 50° C. to approximately 80° C. is suitable.

The forming itself may be carried out as a thermoforming method, as compressed air forming or as vacuum forming.

During the forming there is preferably used a stamping tool, in particular in the form of a stamping die, a stamping wheel, a stamping roller or a multiple-part, in particular chain-shaped, stamping tool.

The forming may be carried out with a sheet element that is conveyed in the longitudinal direction intermittently or indeed continuously, wherein if a stamping die is used a continuous method may likewise be implemented, in particular by moving the stamping die along with the insulating bar as the latter passes through the forming device.

These and further advantages of the present invention are described in further detail below with reference to the drawings and the exemplary embodiments.

BRIEF DESCRIPTION OF THE SEVERAL VIEWS OF THE DRAWINGS

Individually, in the drawings:

FIG. 3B shows a rotating stamping tool of the production plant in FIG. 2, for producing a connection strip geometry;

FIG. 3C shows a further rotating stamping tool of the production plant in FIG. 2, for producing a corrugated structure, in a perspective illustration;

DETAILED DESCRIPTION OF THE INVENTION

Figure 1A:
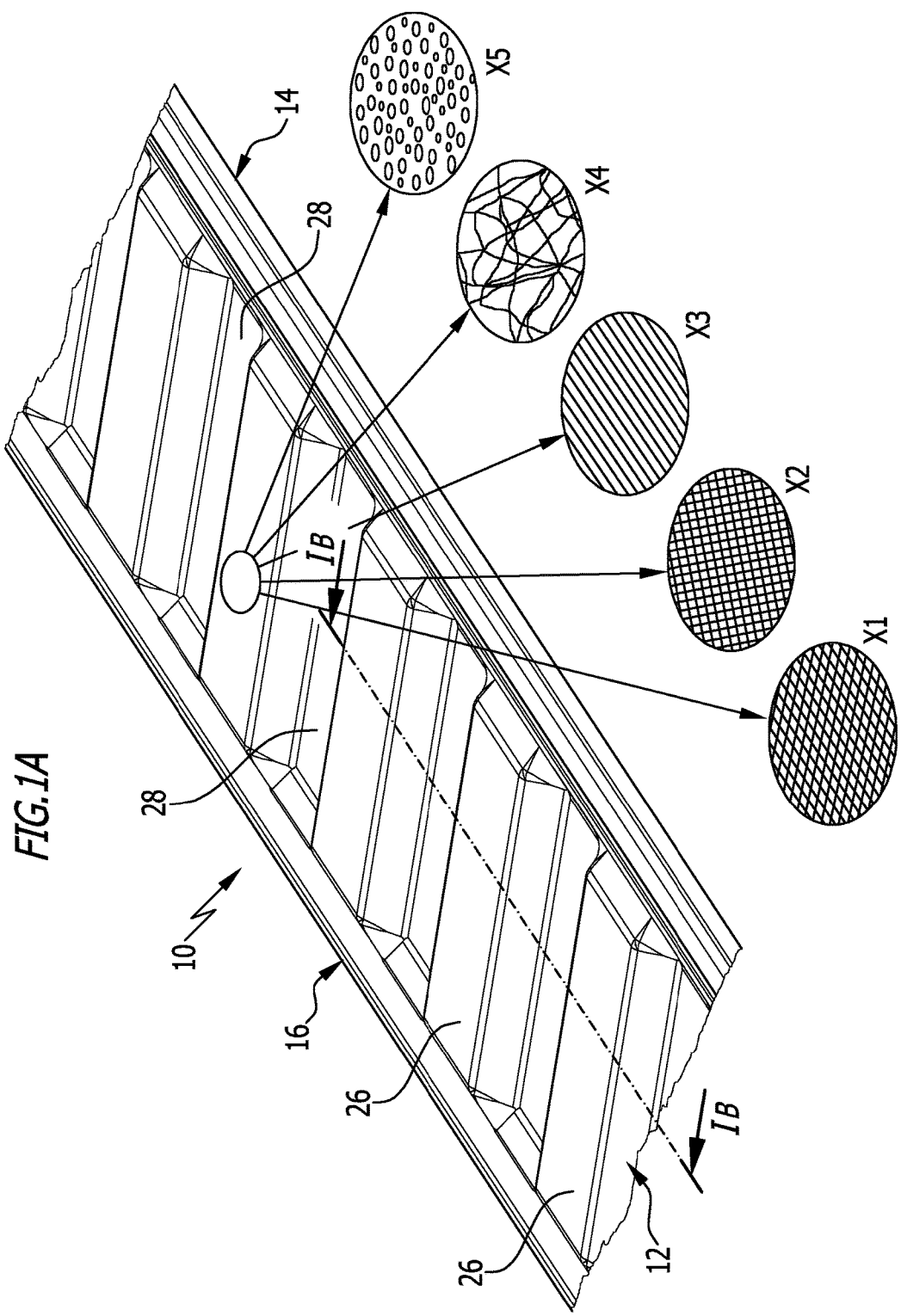
FIG. 1A shows a perspective illustration of an insulating bar manufactured according to the invention.
Figure 1B:
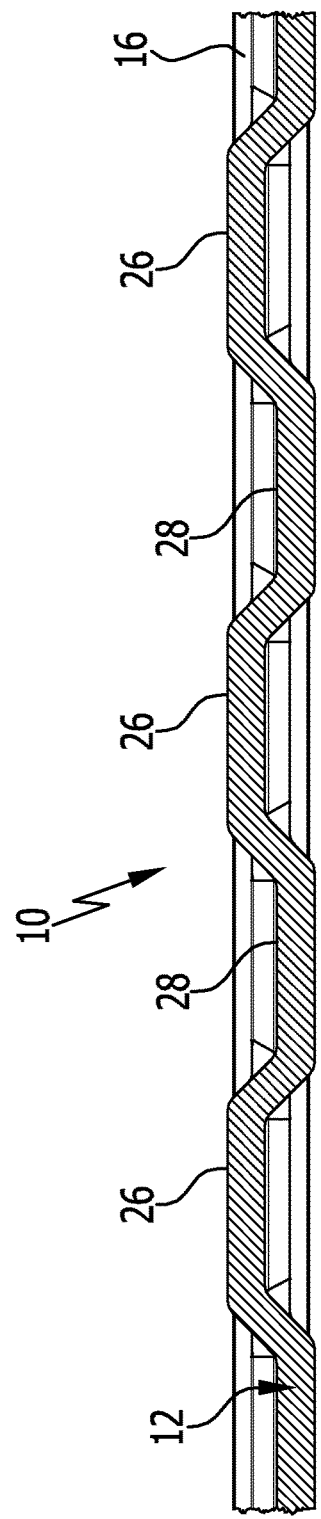
FIG. 1B shows a sectional view along line IB-IB through the insulating bar in FIG. 1A.

FIGS. 1A and 1B show an insulating bar 10 having a strip-like base body 12 and connection strips 14, 16 that are integrally formed on the opposite longitudinal edges thereof, by means of which the insulating bar is introducible into corresponding receptacles in metal profiles and can be held by frictional, force or positive locking.

The cross sections of the connection strips 14, 16 are adapted to the cross sections of the corresponding receptacles in the metal profiles (not shown) such that, in a so-called "rolling" step, only a slight deformation of the receptacles in the metal parts is required in order for example to make a shear-resistant connection between the insulating bar and the respective metal profile.

Accordingly, it is of considerable significance that the connection strips 14, 16 have a defined geometry with only small tolerances. This is true in particular of processing insulating bars to give relatively large window, door or façade elements in which sections of the insulating bars and the corresponding metal profiles have to be installed with lengths of 1 to 2 m or indeed more.

The strip-like base body 12 has a structure obtained by the method according to the invention, which will be described in further detail below, having alternating raised portions 26 and recesses 28. Because of the structure of the strip-like base body 12 with raised portions 26 and recesses 28, the wall thickness of the strip-like base body 12 may be made smaller than in conventional insulating bars, since the production of the raised portions 26 and recesses 28 allows an additional improvement in the mechanical properties of the insulating bar 10 as a whole to be achieved. This results not only in a saving on materials when the insulating bars 10 are manufactured but additionally in an increase in the thermal resistance and hence in an improvement in the heat insulation of the composite profiles that are obtained using the insulating bar 10 manufactured according to the invention.

In FIG. 1A, different textures in the interior of the base body 12 are illustrated schematically in the enlarged illustrations X1 to X5.

In illustrations X1 to X4, different examples of the arrangement of reinforcing fibres in the plastics material of the base body 12 are illustrated. In illustration X5, a porous structure is schematically shown.

Illustration X1 shows a fibre-reinforced plastics material in which the fibres have been oriented parallel and perpendicular to the longitudinal direction of the insulating bar. The reinforcing fibres may be embedded in the plastics material for example as a woven fabric.

Illustration X2 shows a fibre-reinforced plastics material in which the fibres are oriented in two mutually perpendicular directions, each at an angle of approximately 45° to the longitudinal direction of the insulating bar 10. Here too, the reinforcing fibres may be incorporated into the plastics material as a woven fabric.

Illustration X3 shows reinforcing fibres in the plastics material that run parallel to the longitudinal direction of the insulating bar 10, where in this case individual fibres, in particular long fibres or indeed fibre strands, may be used.

Illustration X4 shows reinforcing fibres that are embedded in the plastics material of the base body in the form of a tangled nonwoven.

Illustration X5 shows a porous structure in the interior of the base body.

In the case of illustrations X1 to X4, the presence of the reinforcing fibres is not necessarily visible at the surface of the base body. In many cases, the provision of the reinforcing fibres can be limited to the internal or core region of the insulating bars 10.

The same also applies to the pore structure that is shown in illustration X5, which can be limited to a core region of the base body 12 or insulating bar 10. As an alternative, the pore structure may also extend up to the surface of the insulating bar 10.

Figure 2:
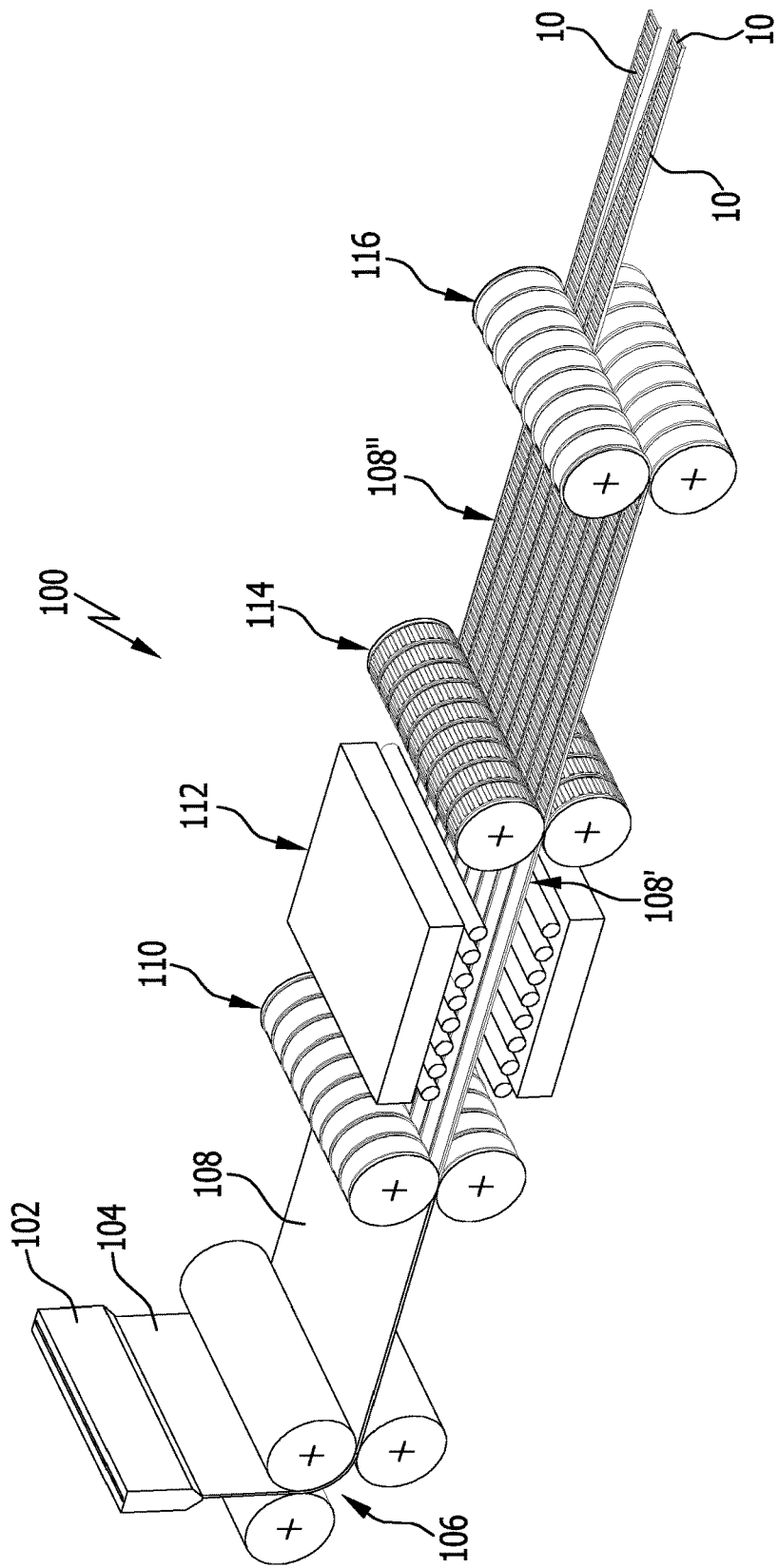
FIG. 2 shows a schematic illustration of a production plant that includes a calender and is for carrying out a first variant of the method according to the invention.

A first production plant 100 for the insulating profile bars 10 according to the invention is shown in FIG. 2. The production plant 100 includes an extrusion tool 102 having a substantially rectangular nozzle outlet that initially produces a band-like extrudate 104. The extrudate 104 is guided over a so-called calender 106, in which the band-like extrudate is calibrated in respect of its thickness and a planar sheet element 108 is produced. The calender 106 can produce the sheet element 108 not only with a calibrated thickness but in particular also with correspondingly smooth surfaces. The extrudate 104 comes out of the nozzle of the extrusion tool 102 as a melt, substantially vertically downwards, and is deflected about approximately 90° in the calender. After it has left the calender 106, the sheet element is preferably guided substantially in one plane in the production plant.

The plastics material of the band-like extrudate is preferably cooled as it passes through the calender such that, as it leaves the calender 106, the planar sheet element 108 is preferably at a temperature that, in the case of (partially) crystalline plastics materials, is approximately 30° C. below the crystallite melting point of the plastics material or higher, and in the case of amorphous plastics materials is approximately 30° C. above the softening point or higher.

The planar sheet element 108, which has a predetermined heat content, is then fed into a first forming device 110, in which two rolls driven in opposite directions stamp the sheet element 108 with the connection strip geometry of a plurality of insulating bars that are arranged parallel next to one another (in the present example, nine insulating bars 10 are manufactured parallel to one another at the same time by forming). For this step, the forming temperature is likewise preferably, in the case of (partially) crystalline plastics materials, approximately 30° C. below the crystallite melting point of the plastics material or higher, and in the case of amorphous plastics materials is approximately 30° C. above the softening point or higher. If, at the time of entering the forming device 110, the temperature of the planar sheet element 108 is higher than approximately 30° C. above the crystallite melting point or approximately 60° C. above the softening point, the forming device 110 is preferably cooled. Otherwise, the forming device 110 or the tool thereof is preferably cooled to a temperature in the range of approximately 50° C. to approximately 80° C.

If necessary, there is provided downstream of the forming tool 110 a heating station 112 by means of which the temperature of the sheet element 108 may if needed be raised to a predetermined forming temperature before the sheet element 108' is supplied to a further forming device 114 in which (if desired) a corrugated structure having raised portions 26 and recesses 28 can be produced in the insulating bars 10 (sheet element 108").

Optionally, the forming tool 110 or the forming device 114 may be constructed as a severing device such that the individual insulating bars may be separated at the same time as forming.

Finally, the sheet element 108", with the geometry of the insulating bars 10 already in its final shape, with connection strips and corrugated structure, is supplied to a separating tool 116 in which the connection between the insulating bars 10, as it is still present in the sheet element 108", is removed such that mutually separated insulating bars 10 (of which only three are shown in FIG. 2 for the sake of clarity) are obtained at the outlet of the separating tool 116. Preferably, the temperature of the plastics material as it enters the separating tool 116 is below the heat deflection temperature under load, further preferably below the maximum long-term service temperature of the plastics material.

Figure 3A:
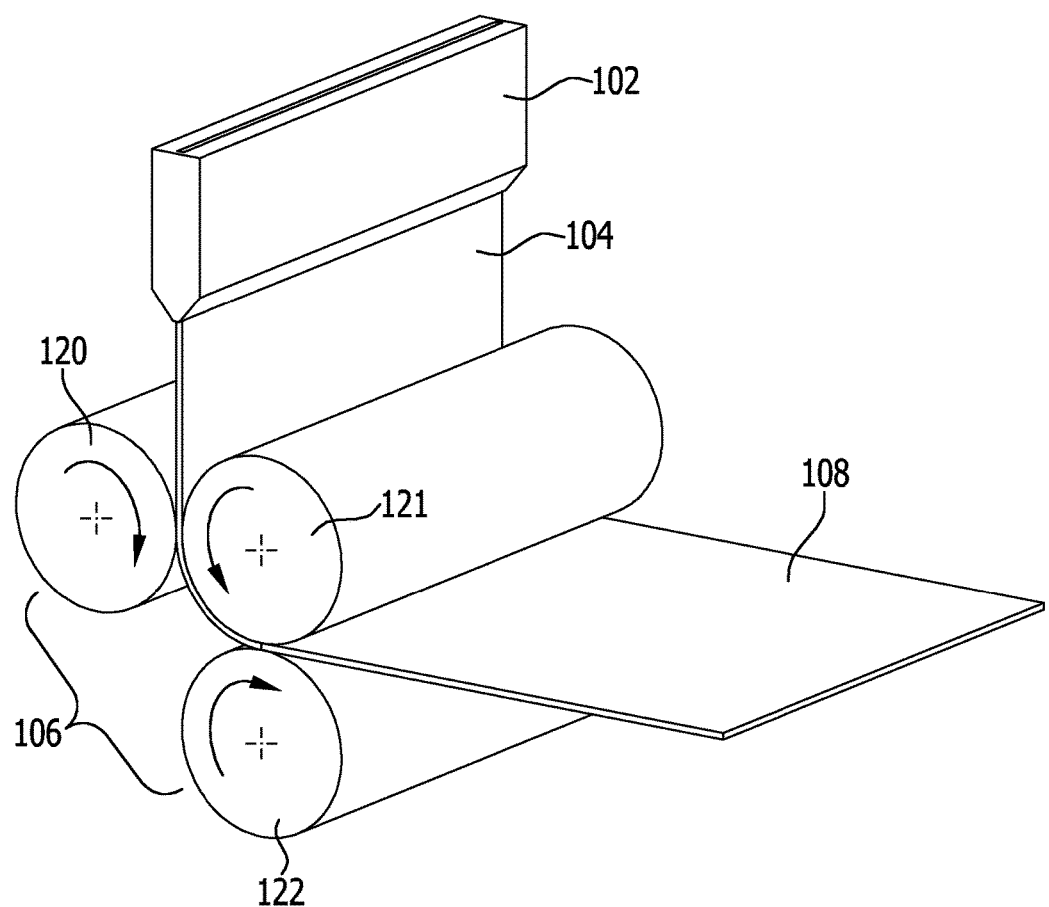
FIG. 3A shows the calender of the production plant in FIG. 2.

FIG. 3A shows as a detail the extrusion tool 102 having a wide slot nozzle of rectangular cross section, out of which the molten extrudate 104 comes in the form of a strip and is subsequently taken up by the calender rolls 120, 121 and 122 of the calender 106 and made into the planar sheet element 108.

FIG. 3B shows as a detail the forming tool 110, having a profiled pair of rollers 124, 126 that form the planar sheet element 108 to give a sheet element 108' which already has the connection strip geometry of the insulating bars 10 to be manufactured. If the insulating bars have no need of a corrugated structure, the sheet element 108' can be supplied directly to the separating tool 116.

Figure 3D:
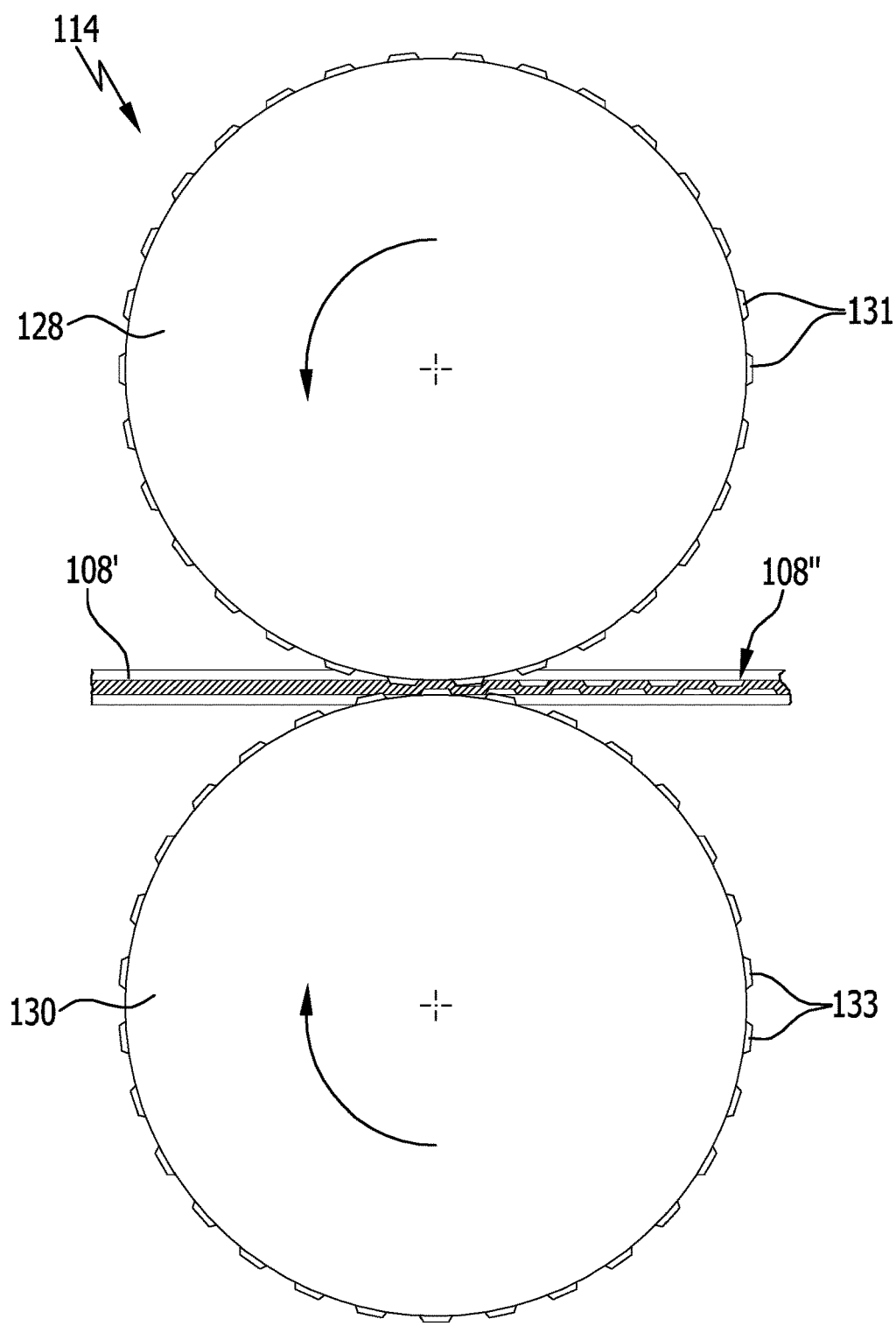
FIG. 3D shows the stamping tool in FIG. 3C in side view.

The second forming device 114 having rollers 128, 130 is shown in greater detail in a perspective view in FIG. 3C, and in a side view in FIG. 3D. The rollers 128, 130 are equipped with raised portions 131, 133 such that they can be positioned and driven in a manner engaging in one another, as best seen in FIG. 3D, such that, when the sheet element 108' passes through, the corresponding corrugated structure of the sheet element 108" with raised portions and recesses is produced. In the peripheral direction, the rollers 128, 130 have grooves in which the already formed connection strip geometry is received and supported.

Figure 5A:
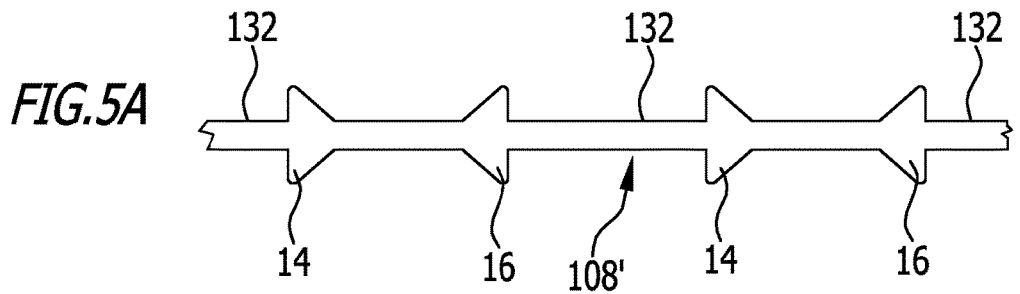
FIGS. 5A and 5B show a cross sectional illustration and perspective view of a sheet element that has been formed to have a plurality of parallel insulating bar structures.
Figure 5B:
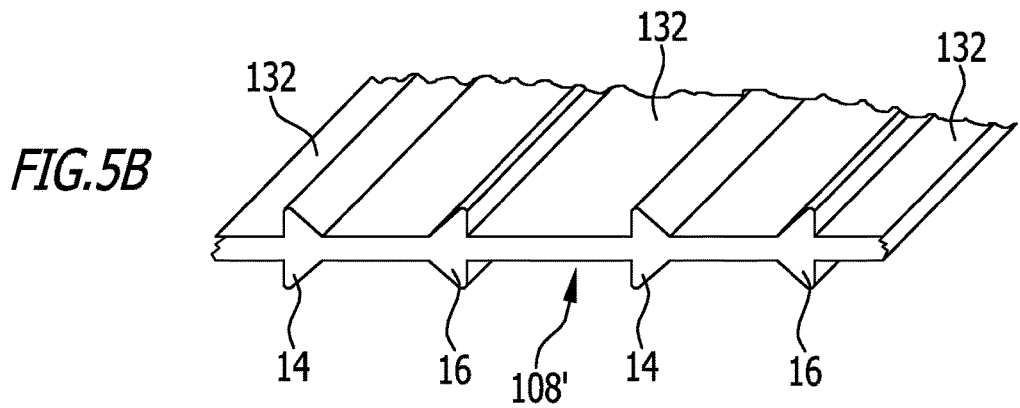
Figure 5C:
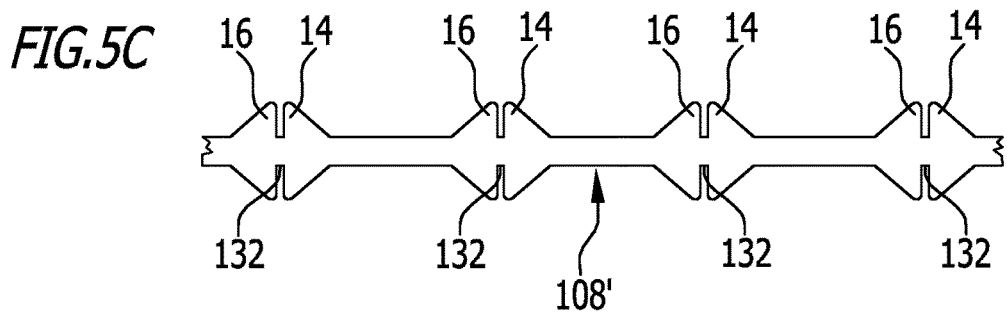
FIGS. 5C and 5D show a cross sectional illustration and perspective view of a sheet element that has been formed in an alternative manner to have a plurality of parallel insulating bar structures.
Figure 5D:
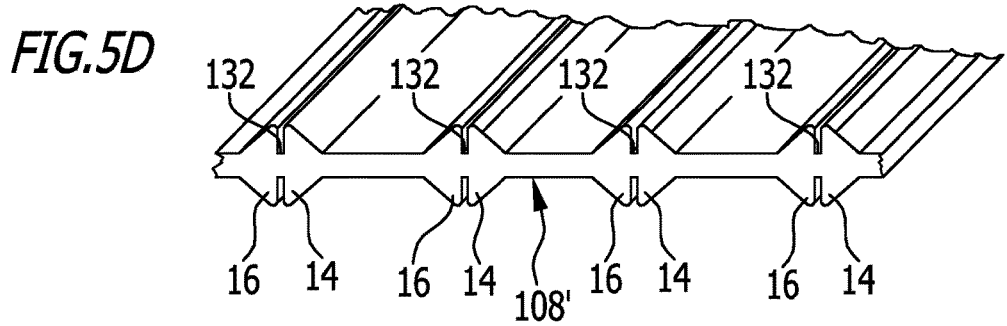

The sheet element 108' or 108" contains a plurality of parallel insulating bar geometries which are connected to one another by way of webs 132 of plastics material, as illustrated in FIGS. 5A and 5B in plan view and perspective illustration respectively. The webs 132 are severed at the connection strips 14 and 16, which each delimit an insulating bar, resulting in the individual insulating bars 10.

If no corrugated structure is needed in the insulating bars to be manufactured, the forming procedure is already complete after they have passed through the forming device 110, and all that is still required is to separate the sheet element 108' into individual insulating bars 10. Otherwise, the sheet element 108' additionally undergoes a second forming step in the second forming device 114, as described above, and is only then supplied to the separating tool 116 as sheet element 108".

According to the invention, insulating bars of different geometry may be manufactured at the same time, in which case the rollers 124, 126 and/or 128, 130 are constructed in modular form as roller segments that are adapted to the different geometries, for example as discs that are pushable onto a drive shaft.

Different thicknesses of insulating bar can be taken into account by means of a calender 140 of modular construction having roller segments of different diameter.

Figure 4:
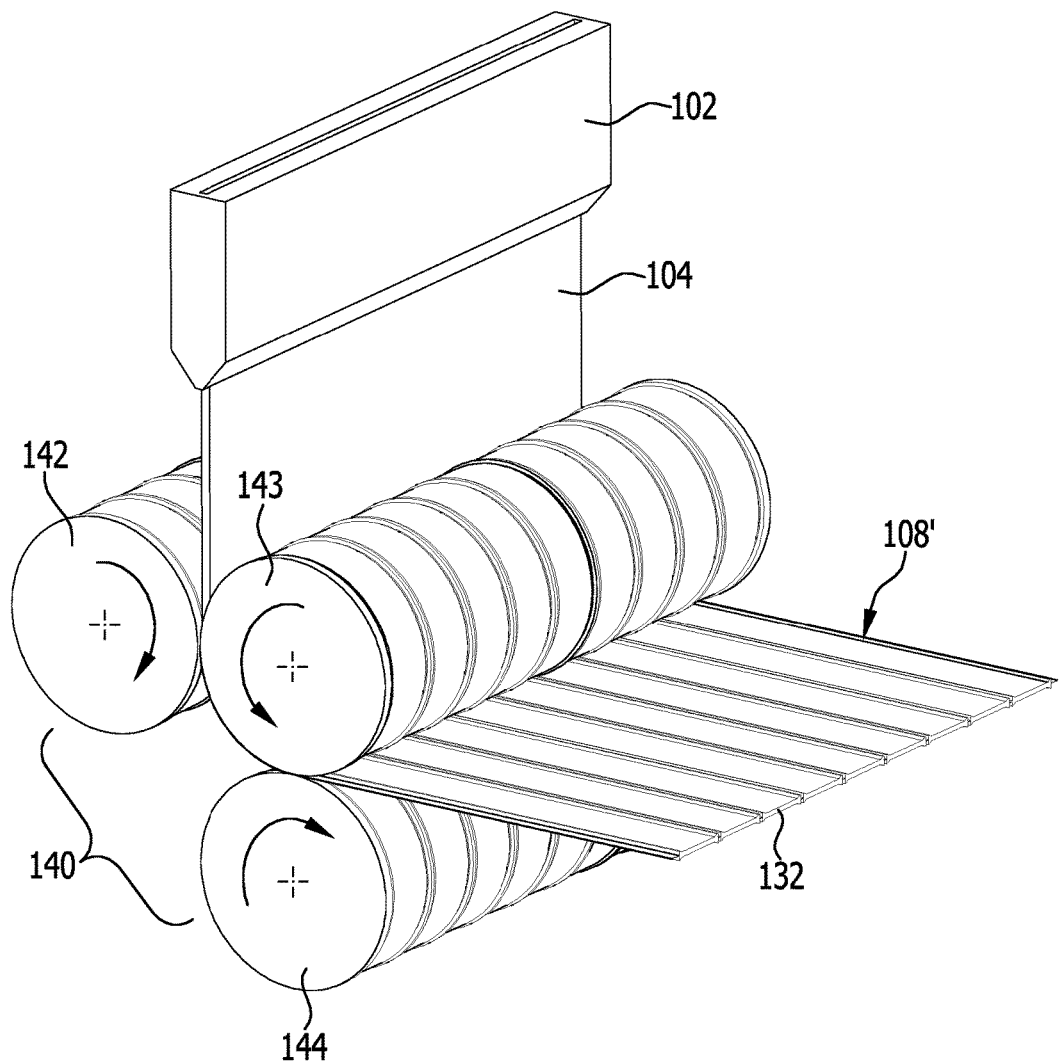
FIG. 4 shows an alternative calender for the production plant in FIG. 2.

FIG. 4 shows an alternative possibility for constructing the production plant 100 for the insulating bars 10, in which the wide slot die, likewise of rectangular cross section, of the extrusion tool 102 produces a molten extrudate 104 in the form of a strip that is supplied to a modified calender 140.

The calender 140 contains three calender rolls 142, 143, 144 which are contoured on their surface in the peripheral direction, and by means of this contouring the band-like extrudate 104 can be formed by making the thickness of the extrudate 104 uniform, directly to give a sheet element 108' that already contains the connection strip geometry of the insulating bars 10 which are to be manufactured and are connected parallel to one another.

According to a further variant, the rollers 142, 143, 144 may additionally be constructed to have raised portions similar to the raised portions 131, 133 of the rollers 128, 130, as visible in FIG. 3C, such that in addition to the connection strip geometry a corrugated structure can then also be produced in the calender 140.

FIGS. 5A and 5B show a first shape of the sheet element 108' in which, as already mentioned above, the individual insulating bar geometries are connected to one another by way of webs 132. The webs 132 adjoin the connection strips 14, 16 of the insulating bar geometries. These webs 132 are then severed in the separating tool 116 directly at the connection strips 14 and 16 respectively, such that aftertreatment of the connection strips 14, 16 can preferably be dispensed with. The web material can be recycled.

As an alternative, the insulating bar geometries may be connected by way of webs 132 that leave only a small spacing between adjacent insulating bar geometries. The webs 132 are then likewise removed in the separating device 116, wherein this may for example also be performed by machining, as described below with reference to FIGS. 6A to 6D.

Figure 6A:
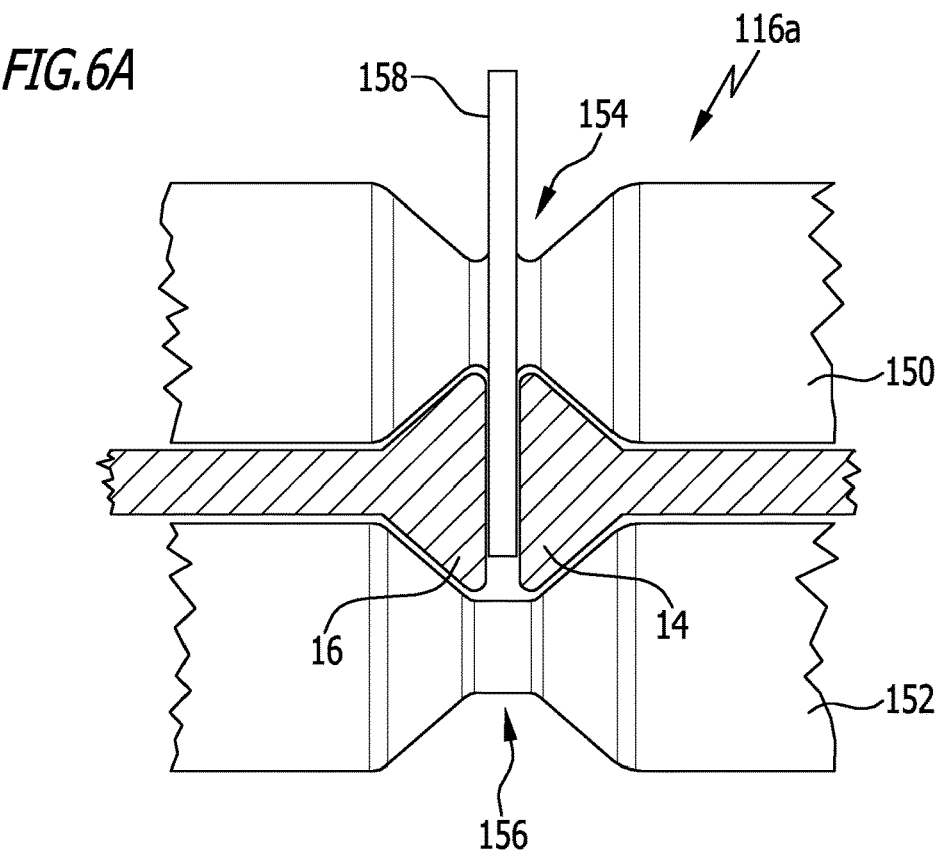
FIGS. 6A to 6D show various alternative devices for separating the formed sheet element in FIGS. 5A and 5B into individual insulating bars.

FIG. 6A shows a first variant of the separating device 116, as separating device 116a, in which the connection strips 14, 16 of the insulating bar geometry are guided between a pair of shafts 150, 152. In this case, the shafts 150, 152 are constructed such that they mirror the insulating bar geometry in their cross section and in particular have guides in which the connection strips 14, 16 are received and guided. Moreover, the shaft 150 has a separating tool 158, which in the present example is constructed as a disc that, by means of its edge region, displaces the material of the web 132 and so results in pinching off the connection between adjacent insulating bar geometries.

Figure 6B:
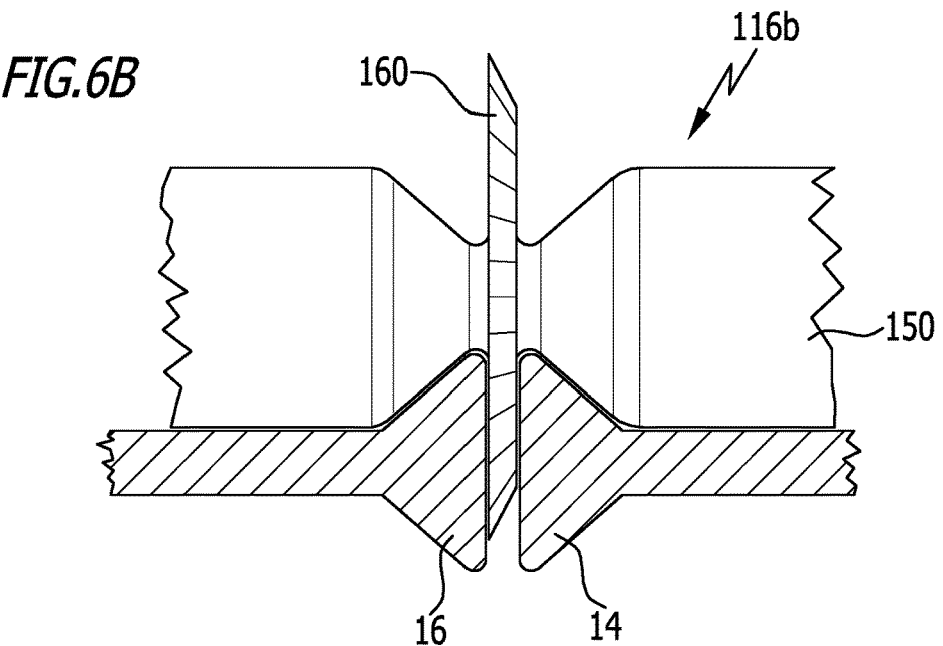

As an alternative, as shown in FIG. 6B, in a separating device 116b the shaft 150 can be provided with a cutting roller 160 that removes the material of the web 132 by machining.

Figure 6C:
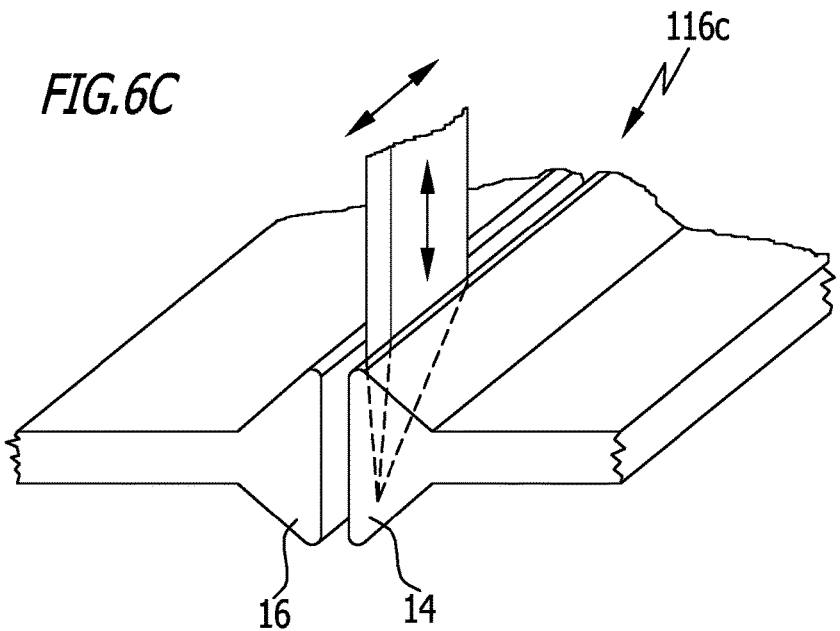

FIG. 6C shows a further variant of a separating device 116c, in which the web 132 is severed by means of a blade 162 that is fixed or is oscillated in the vertical and/or horizontal direction. In the case of this separating device 116c too, the insulating bar geometry is guided and supported, preferably at least in the region of the connection strips 14, 16.

Figure 6D:
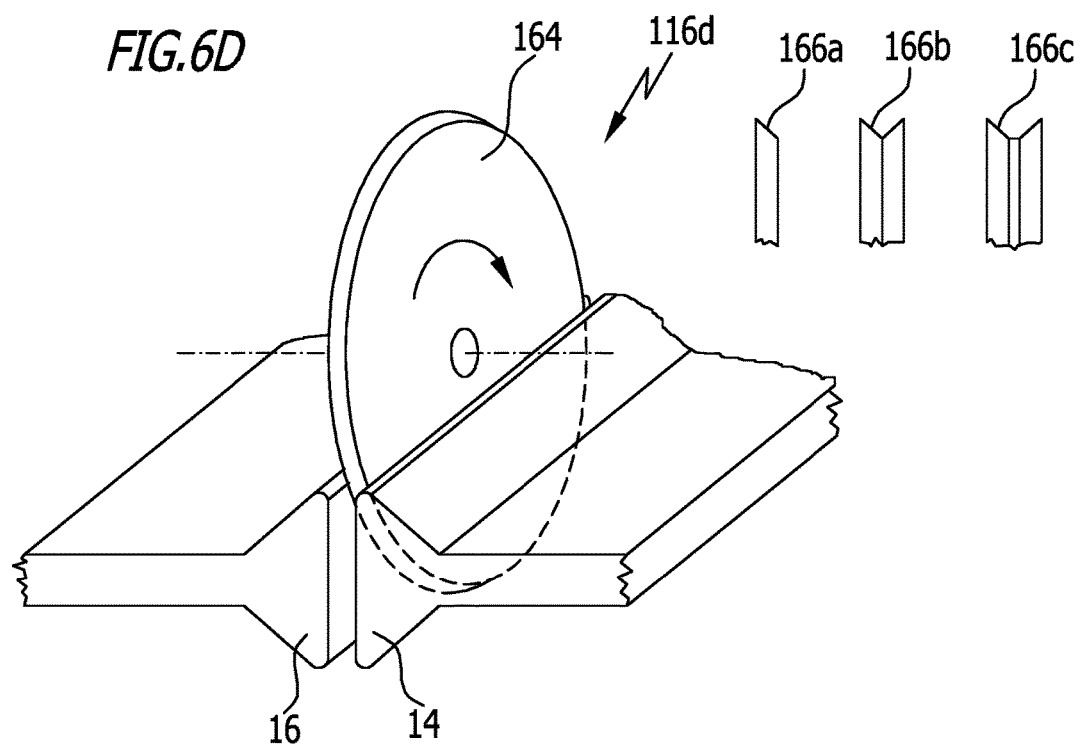

The variant of a separating device 116d that is shown in FIG. 6D may be constructed in a manner analogous to the separating device 116c, but has a cutting disc 164 that is driven in rotation. FIG. 6D shows various edge geometries 166a, b, c of the cutting disc 164, which can be adapted in particular to the width of the web 132.

Figure 7:
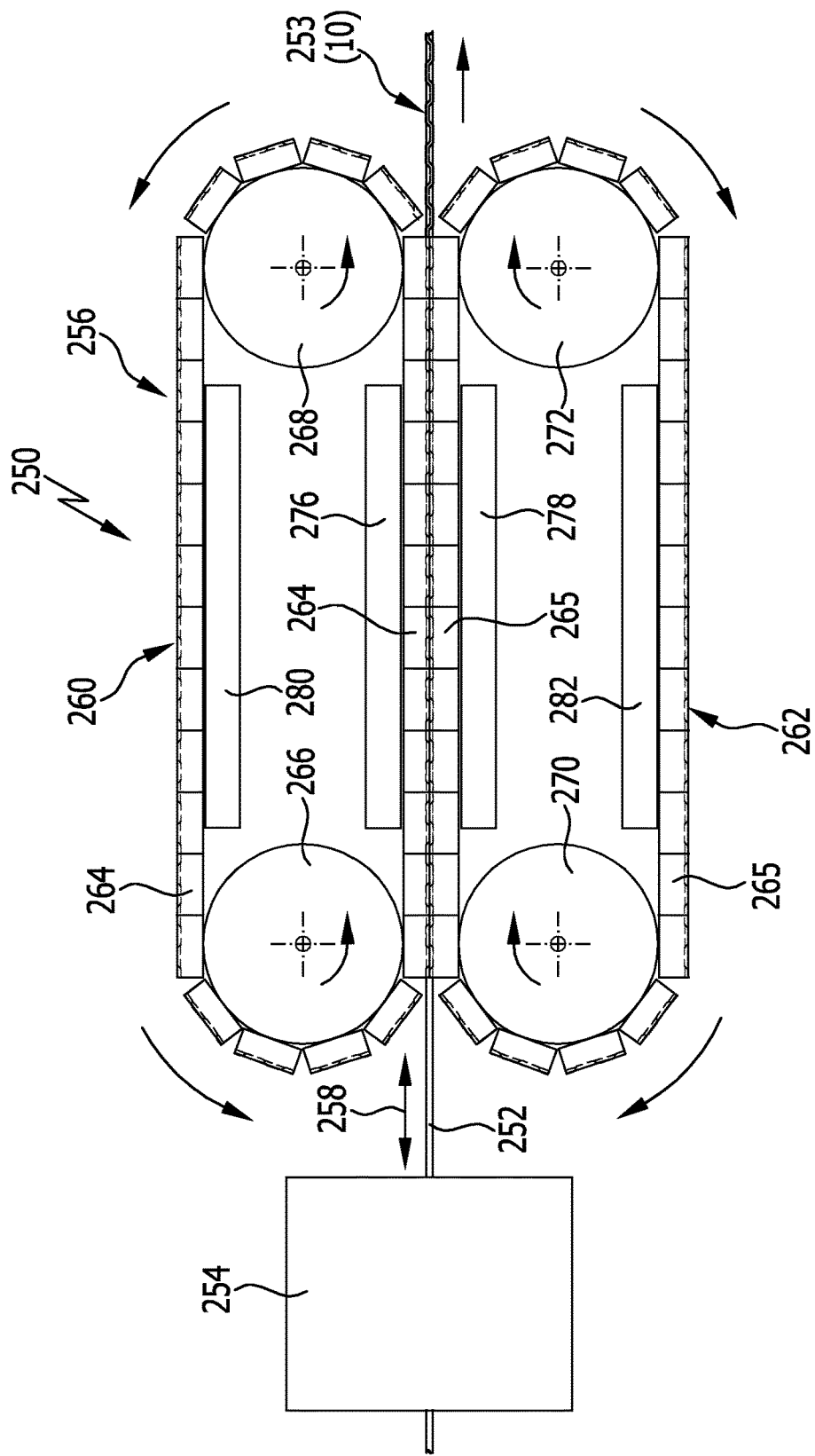
FIG. 7 shows a schematic illustration of a further production plant for carrying out the method according to the invention.

With reference to FIG. 7, a further variant of the method according to the invention for manufacturing an insulating bar 10 is described in which, in a production plant 250, in a first method step a band-like extrudate 252 is extruded by means of an extrusion tool 254 and is subsequently supplied, having been given a predetermined heat content as a result of the extrusion procedure, to forming in a forming device 256, here just called a corrugating machine. The heat content and hence the temperature of the band-like extrudate as it enters the corrugating machine 256 can be set in a very simple manner by varying the spacing 258 between the extrusion tool 254 and the upstream end of the corrugating machine 256.

In the corrugating machine 256, the band-like extrudate 252 is formed such that at the same time the connection strips 14, 16 and the base body 12 having the raised portions and recesses (if desired) are produced to give an insulating bar arrangement.

The corrugating machine 256 includes two forming tools 260, 262 in the manner of belts or chains, which are driven in opposite directions and are composed of a multiplicity of mould block elements 264 and 265 that are movably connected one after the other, as seen in the longitudinal direction.

The forming tools 260, 262 are each mounted by means of a pair of deflection rollers 266, 268 and 270, 272 respectively such that they are drivable in synchronism with the speed of conveying the extrudate 252.

A plurality of the mould block elements 264 and 265 of the two forming tools 260, 262 are pressed against one another, in a position facing the extrudate 252, by way of a pressing device having press blocks 276, 278, in order to form the extrudate 252, which is guided between the mould block elements 264 of the forming tool 260 and the mould block elements 265 of the forming tool 262, by an appropriate pressure to give the desired geometry, in particular also the cross sectional and longitudinal sectional geometry. The extrudate 252 leaves the corrugating machine 256 on the downstream side as a sheet element 253 that has been formed into the insulating bar arrangement—and if the extrudate 252 has only the width of an individual insulating bar, as a finished insulating bar 10. If the width of the extrudate 252 corresponds to the width of a plurality of insulating bars 10, the plurality of insulating bars then leave the corrugating machine 256 connected to one another as a sheet element 253 and are then separated in a separating device to give individual insulating bars 10, as already described as a separating device 116 in conjunction with FIG. 2.

On their side remote from the extrudate 252, the forming tools 260, 262 are preferably supported at their mould block elements by a guide 280, 282 such that as uniform as possible a movement sequence is obtained for the forming tools 260, 262.

In FIGS. 8A to 8E, the mould block elements 264, 265 are shown as details and in different views.

Figure 8A:
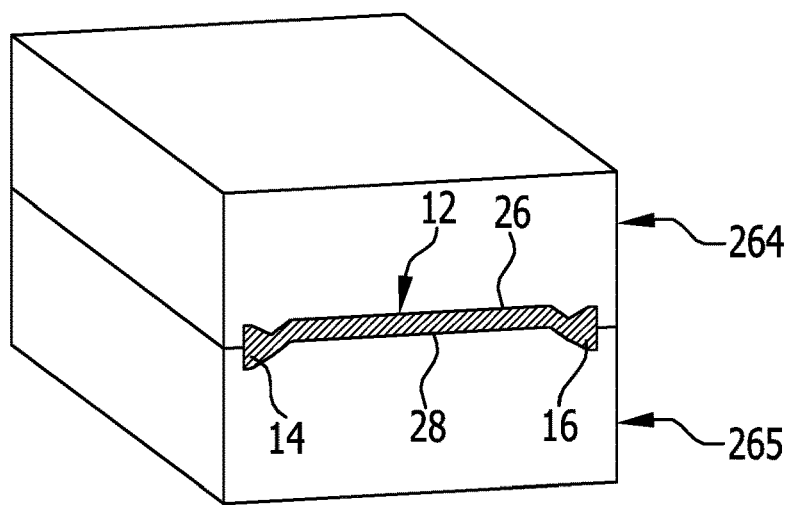
FIGS. 8A to 8E show a schematic illustration of details of the production plant in FIG. 7.

FIG. 8A shows two mould block elements 264, 265 of the forming tools 260, 262, wherein the construction of the mould block elements 264, 265 in cross section is such that it results in an insulating bar 10 having offset connection strips 14, 16.

Figure 8B:
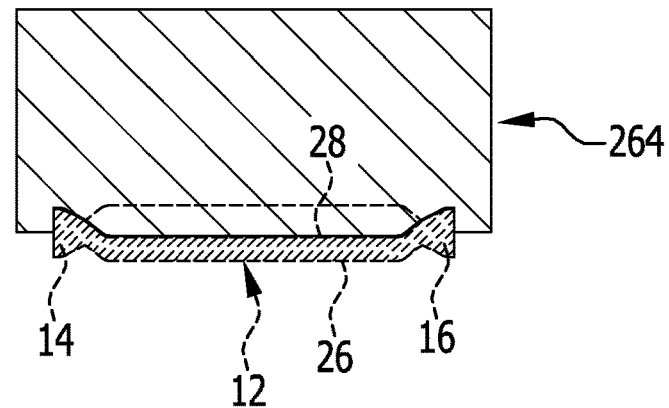
Figure 8C:
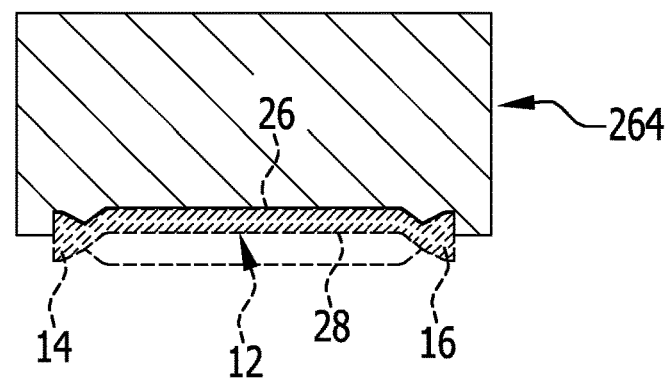

The cross section of the individual mould block elements 264 and 265 varies over the length of the mould block elements in the longitudinal direction of the forming tools 260 and 262, as shown in FIGS. 8B and 8C with reference to the mould block element 264.

In the illustration of FIG. 8B, the mould block element 264 has a cross sectional shape by means of which recesses are to be made in the insulating bar 10, whereas FIG. 8C has a cross section for producing a raised portion 26.

The mould block elements 265 are constructed with their geometry facing the mould block element 264 in a correspondingly complementary manner in order to produce the configuration of the insulating bar 10 that was shown in FIG. 1 and described above in detail.

Figure 8D:
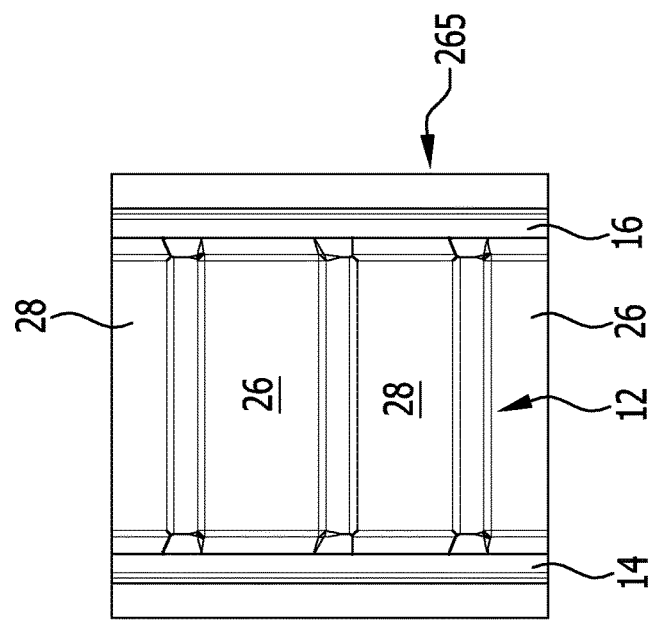
Figure 8E:
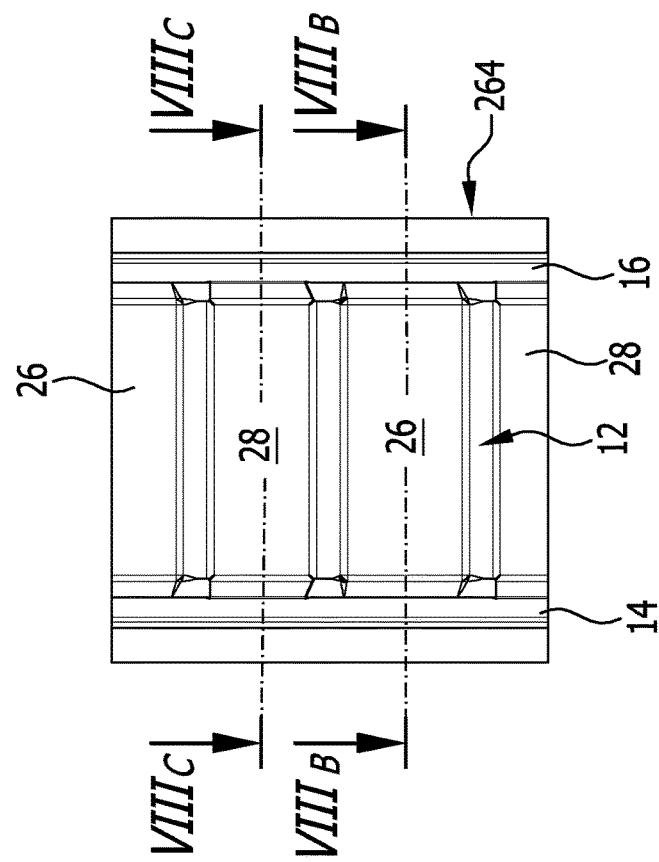

Finally, FIGS. 8D and 8E show the surfaces of the mould block elements 264 and 265 that face the extrudate 252, wherein the details of the surface construction are provided with the same reference numerals as were used in the scope of describing FIG. 1 to describe the formed insulating bar with connection strips 14, 16 and raised portions and recesses 26, 28.

The invention claimed is:

1. A method for manufacturing insulating bars made from a thermoplastic plastics material, wherein an insulating bar has a strip-shaped base body and, integrally formed on the opposite longitudinal edges thereof, connection strips, the method comprising:
producing a band-shaped extrudate having a substantially rectangular cross section from the plastics material;
producing an insulating bar arrangement having a longitudinal direction and a shape of an individual insulating bar or a shape of a plurality of insulating bars that are joined together and are arranged parallel next to one another from the band-shaped extrudate; and
severing the insulating bar arrangement in its longitudinal direction to provide mutually separated insulating bars.

2. The method according to claim 1, including shaping the band-shaped extrudate in a calender to provide a planar sheet element, and supplying the planar sheet element to a forming device for production of the insulating bar arrangement.

3. The method according to claim 2, including calibrating the band-shaped extrudate in the calender to a predetermined thickness.

4. The method according to claim 2, wherein the band-shaped extrudate is supplied with a heat content from shaping the band-shaped extrudate directly to the forming device.

5. The method according to claim 4, wherein the forming device is a stamping device or a calender.

6. The method according to claim 1, including supplying the band-shaped extrudate to a calender, and producing the insulating bar arrangement directly in the calender from the band-shaped extrudate.

7. The method according to claim 1, wherein the insulating bar arrangement, restricted to the base body or base bodies of the insulating bar arrangement, as seen in the longitudinal direction of the base body or base bodies, is produced alternately with raised portions and recesses in a region of the base body.

8. The method according to claim 7, including producing the base body and the connection strips adjoining the base body from the band-shaped extrudate and then forming the base body or bodies to produce the raised portions and recesses.

9. The method according to claim 8, including supporting the connection strips during production of the raised portions and recesses in order to maintain cross sectional geometry of the raised portions and recesses.

10. The method according to claim 7, including producing the base body or bodies having the connection strips adjoining the base body or bodies and the raised portions and recesses in the region of the base body at substantially the same time from the band-shaped extrudate.

11. The method according to claim 7, including first producing the raised portions and recesses of the base body or bodies and then producing the connection strips adjoining the base body or bodies.

12. The method according to claim 7, including producing the alternating raised portions and recesses at regular intervals, as seen in the longitudinal direction of the base body or bodies.

13. The method according to claim 7, including producing the raised portions and recesses such that the raised portions and recesses extend substantially over an entire width of the base body or bodies.

14. The method according to claim 13, wherein the raised portions and recesses extend substantially perpendicular to the longitudinal direction of the insulating bar arrangement.

15. The method according to claim 1, wherein producing the insulating bar arrangement includes forming the base body or base bodies, if the thermoplastic plastics material is a crystalline plastics material having a crystalline melting point, at a forming temperature approximately 30° C. below the crystallite melting point of the thermoplastics plastics material or higher, and if the thermoplastic plastics material is an amorphous plastics material having a softening point, the forming temperature is approximately 30° C. above the softening point or higher.

16. The method according to claim 15, wherein a tool is used for producing the insulating bar arrangement and the tool is kept at a temperature that is lower than approximately 120° C.

17. The method according to claim 16, wherein the tool is kept at a temperature in the range of approximately 50° C. to approximately 80° C.

18. The method according to claim 1, wherein the thermoplastic plastics material is selected from polyamides (PA), polypropylene (PP), acrylonitrile butadiene styrene copolymers (ABS), polyphenylene ether (PPE), syndiotactic polystyrene (sPS), polyvinyl chloride (PVC), polyesters, polyketones, thermoplastic polyurethanes (TPU) and blends of the above-mentioned polymers.

19. The method according to claim 1, wherein the thermoplastic plastics material is a compact, substantially pore-free material.

20. The method according to claim 1, wherein the thermoplastic plastics material is present as a porous material in at least a region of the insulating bar.

21. The method according to claim 20, wherein the thermoplastic plastics material of the base body of the insulating bar is a porous material.

22. The method according to claim 20, wherein the porous thermoplastic plastics material of the insulating bar has a pore volume in the range of approximately 5 to approximately 30 vol %.

23. The method according to claim 20, wherein the porous thermoplastic plastics material of the insulating bar has an average pore size of approximately 5 μm to approximately 150 μm.

24. The method according to claim 1, wherein the thermoplastic plastics material includes one or more additives selected from glass fibres, mineral fibres, plastics fibres, hollow glass spheres, fire retardants and blowing and expansion agents.

25. The method according to claim 1, wherein the thermoplastic plastics material includes an impact modifier.

26. The method according to claim 1, wherein producing the insulating bar arrangement is by thermoforming, compressed air forming, or vacuum forming.

27. The method according to claim 26, wherein producing the insulating bar arrangement includes forming by a stamping tool.

28. The method according to claim 27, wherein the stamping tool is selected from a stamping die, a stamping wheel, a stamping roller, a multiple-part stamping tool, and a chain-shaped multiple-part stamping tool.

29. The method according to claim 1, wherein producing the band-shaped extrudate includes continuous conveying in the longitudinal direction.

30. The method according to claim 1, wherein producing the insulating bar arrangement includes forming the base body to produce the raised portions and recesses in a plurality of steps.

31. The method according to claim 1, including producing two or more parallel insulating bars that are joined to one another from the band-shaped extrudate, wherein the connection strips of two directly adjacent insulating bars are connected to one another in each case by a web made from plastics material, and removing or severing the web by machining, cutting or pinching off in order to separate the individual insulating bars.

* * * * *